Figure 1:
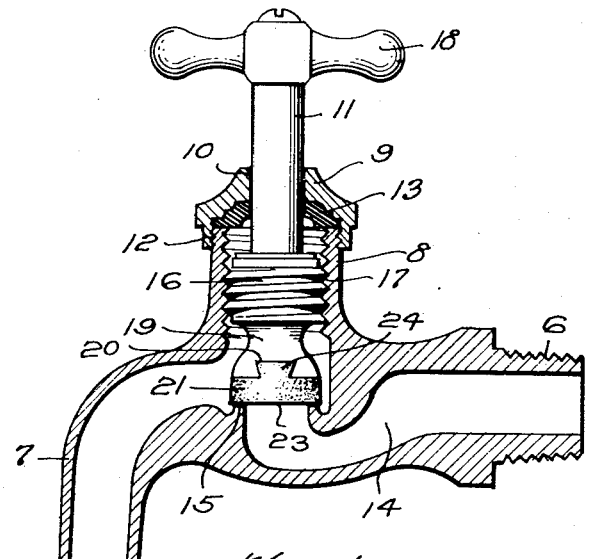

Sept. 26, 1933.  W. C. WOOD  1,928,276

FAUCET PACKING WASHER

Filed Oct. 1, 1932

Inventor
WILLIAM C. WOOD,
By James N. Cujles
His Attorney

Patented Sept. 26, 1933

1,928,276

UNITED STATES PATENT OFFICE 1,928,276

FAUCET PACKING WASHER

William C. Wood, Washington, D. C.

Application October 1, 1932. Serial No. 635,821

5 Claims. (Cl. 251—27)

This invention relates to packing washers, particularly for use in connection with conventional water faucets, steam and other fluid valves.

It is an object of the present invention to provide a packing washer so constructed as to facilitate its installation without the aid of screws and which will firmly remain in place against displacement.

It is a well known fact that much time has been consumed with the attendant inconvenience in the replacement of worn and leaking packing washers upon water faucets, due in large part to the corroding and breaking of the bronze attaching screws, resulting in unnecessary expense in replacement of valve stem or the removal of the broken screw.

One purpose of the present invention is to provide a packing washer and valve stem so constructed that a new washer may be placed in position with a minimum of time and expense, and entirely avoiding the possibility of breakage either in disassembly or assembly.

A further and important object is the provision of a valve stem and packing washer that is extremely simple in construction, is strong, durable, positive in its locking action, cheap to manufacture and highly convenient in use.

Other important objects and advantages of the invention will be apparent during the course of the following description, reference being had to the accompanying drawing.

Figure 2:
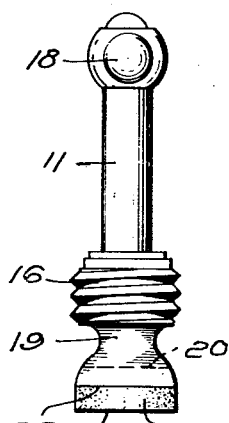
Figure 3:
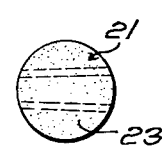
Figure 4:
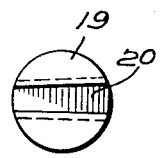
Figure 5:
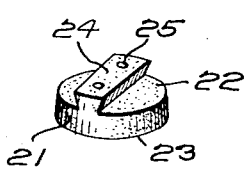
Figure 6:
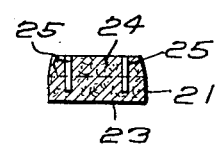

In the drawing:

Figure 1 is a vertical sectional view through a water faucet showing the invention in use, Figure 2 is a side elevation of a valve stem assembly removed from the valve and taken at right angles to the showing in Figure 1, Figure 3 is a bottom plan view of the structure of Figure 2, Figure 4 is a similar view with the packing washer removed, Figure 5 is a perspective view of the improved washer, and Figure 6 is a section through the washer.

Like numerals refer to corresponding parts throughout the several figures of the drawing.

Referring specifically to the drawing, the numeral 5 indicates a valve body as a whole, having a threaded attaching nipple 6, a discharge spout 7 and an open ended tubular portion 8. The tubular portion 8 is normally closed by a bonnet or cap 9 having a centrally arranged opening 10 for the passage of a valve stem 11. The bonnet 9 has screw-threaded attachment with the end of the portion 8, as at 12. Suitable packing 13 is arranged within the bonnet 9, as is customary.

The valve body 5 is formed with a water passage 14 throughout its length, and is provided with a valve seat 15 for dividing such passage. The valve seat 15 is formed in axial alignment with the tubular portion 8, as shown. The structure so far described is of a conventional nature and common to many forms of valves of the faucet type.

The stem 11 is provided with the usual enlarged threaded portion 16 engaging internal threads 17 formed within the tubular portion 8 for imparting reciprocatory movement to the stem and its associated parts. The stem extends above the bonnet 9 and carries the usual operating handle 18. The stem 11 is provided at its lower end, below the threads 16, with an enlarged head 19, the lower face of which is formed flat and provided with a dove-tail wedge shape slot 20. The flat face of the head 19 is formed parallel with the valve seat 15.

The numeral 21 designates an improved packing washer of disc-like formation having upper and lower flat faces 22 and 23. The upper face 22 has a dove-tail rib 24 formed integral therewith, corresponding in size to the slot 20 and likewise formed wedge shaped. The dove-tail rib 24 is reinforced with the body of the washer by pins 25 driven or pressed therethrough, see Figures 5 and 6. The purpose of the pins 25 is to avoid the possibility of breakage between the washer and the dove-tail rib. As shown in Figure 1, the washer 21 is adapted to engage the valve seat 15.

In use, assuming a washer has become worn, the bonnet 9 is removed and the valve stem screwed outwardly until completely disengaged from the portion 8. A slight pressure against the edge of the washer 21 will result in its sliding laterally from engagement with the head 19 through its dove-tailed engagement. A new washer is then slipped into the slot 20 and is limited in such sliding movement by the wedge shape of the slot. Thus the proper positioning of the washer is insured. It might here be pointed out, that the washer of the present invention is formed of fibre or like material, and when submerged in water, steam or the like, will become swollen, resulting in an unusually strong binding action against the side walls of the slot 20. Thus the washer is positively held against displacement without the aid of screws or other separate fastening means. The pins 25 aid in strengthening the rib 24 as a guard against breakage when used in valves having a pitted or worn valve seat, or that has not been used for quite a long time and become stuck.

It will be seen from the foregoing that an extremely simple and efficient packing washer has been provided. The device with its co-acting stem can be manufactured for replacement parts at a minimum of expense, or embodied in new valves without any additional expense. The device avoids the many objectionable features of the old type of screw attached washers. As pointed out, the device is equally applicable to valves other than water, such as steam, and many others adapted to control a fluid. The washer of course can be made in materials other than fibre so as to withstand high pressures and liquids that might tend to disintegrate a fibre washer.

It is to be understood that the invention is not limited to the precise construction shown, but that it includes within its purview whatever changes fairly come within either the terms or the spirit of the appended claims.

Having described my invention what I claim is:

1. A valve of the character described comprising a casing having a valve seat and a valve stem, a packing washer for connection with said stem formed of a material expansible under the action of water, said stem provided with a socket, a transverse rib formed upon said washer for engagement within said socket, said rib and said socket adapted to be held tight with respect to each other under the swelling action of said washer.

2. A valve of the character described comprising a casing having a valve seat and a valve stem, a packing washer for connection with said stem formed of a material expansible under the action of liquids, a dove-tail socket formed in said stem, a dove-tail rib formed upon said washer adapted for engagement in said socket, said washer held in firm engagement with said stem under the swelling action of the rib against the walls of said socket.

3. A valve of the character described comprising a casing having a valve seat and a valve stem, a washer for connection with said stem formed of a material expansible under the action of fluids, said stem provided with a wedge shaped dove-tail slot, said washer provided with a wedge shaped dovetail rib of such size as to snugly fit within said slot, said rib and said slot rigidly held with respect to each other under the action of the expansion of said washer.

4. A valve of the character described comprising a casing having a valve seat and a valve stem, a washer for engagement with said stem formed of a material expansible under the action of liquids, said stem provided with a dove-tail slot, said washer provided with a dove-tail rib adapted to engage in said slot and be held against displacement by the action of the expansion of said washer and reinforcing means between said rib and said washer.

5. A washer of the character described formed of a material expansible under the action of fluids and provided with a dove-tail rib and reinforcing pins passing through said rib and into said washer.

WILLIAM C. WOOD.